UNITED STATES PATENT OFFICE.

GEORGE PEYTON TIPTON, OF HOT SPRINGS, ARKANSAS.

SHOE-BLACKING.

SPECIFICATION forming part of Letters Patent No. 449,339, dated March 31, 1891.

Application filed May 16, 1890. Serial No. 352,089. (Specimens.)

*To all whom it may concern:*

Be it known that I, GEORGE PEYTON TIPTON, a citizen of the United States, residing at Hot Springs, in the county of Garland and State of Arkansas, have invented a new and useful Blacking, of which the following is a specification.

My invention relates to compositions of matter used for polishing boots and shoes. For this purpose I employ as the main ingredient which can be used with the acids and oils of any shoe-polish a black deposit quarried from the earth in Arkansas. This deposit is a carbonaceous substance of a graphitic structure, and on account of its locality derives the name of Arkansas graphite. Being of a naturally oily character, this substance is especially valuable as the color ingredient of shoe-blacking. To attain a shoe-blacking that will give a high and brilliant polish that will be permanent, to give one that will prevent the breaking or cracking of the leather, and one that will resist moisture and evaporation, I combine said graphite with the following elements: molasses, glycerine, tartaric acid, citric acid, and neat's-foot oil, which are mixed together in the following proportions: Arkansas graphite, (graphitic shale,) four drams; molasses, two drams; glycerine, one dram and twenty grains; tartaric acid, fifteen grains; citric acid, five grains; neat's-foot oil, one scruple.

In the preparation of the above compound I first weigh out the requisite amount of the graphite and place it in a suitable receptacle. Then I separately weigh out the remainder of the ingredients—namely, molasses, glycerine, tartaric acid, citric acid, and neat's-foot oil—and mix them thoroughly together by rubbing with a spatula or case-knife. The mass is now agitated with the spatula by striking with its face in order to break up the oil therein into a number of minute globules. After a thorough trituration, and therefore complete consolidation of said substances, the whole is placed into the receptacle containing the graphite previously weighed out and thoroughly and quickly mixed therewith, so as to prevent the oil globules from forming on top of the mass. Now after the intimate incorporation of all the ingredients by a thorough admixture to complete the preparation of this blacking it is ground through an ordinary mill, and is then placed in the usual blacking-boxes, being then in condition for the market.

The blacking is applied to shoes in the customary manner with a brush or other applying medium and polished in the usual way.

Having described the properties of my ingredient and its combination with a number of elements to make a shoe-polish, what I claim, and desire to secure by Letters Patent, is—

1. In a shoe-blacking, the combination of the herein-described Arkansas graphite (graphitic shale) with the oils and acids of an ordinary shoe-blacking, substantially as and for the purposes set forth.

2. The herein-described composition of matter for polishing boots and shoes, consisting of the herein-described Arkansas graphite, (graphitic shale,) molasses, glycerine, tartaric acid, citric acid, and neat's-foot oil, prepared in substantially the proportions specified.

In testimony that I claim the foregoing as my own I have hereto affixed my signature in presence of two witnesses.

GEORGE PEYTON TIPTON.

Witnesses:
WILEY GEORGE PARK ROARK,
WILLIAM WELLS.